(12) United States Patent
Miyajima et al.

(10) Patent No.: US 6,999,149 B2
(45) Date of Patent: Feb. 14, 2006

(54) ACTIVE MATRIX DISPLAY DEVICE WITH ELECTRODE BETWEEN ADJACENT PIXELS

(75) Inventors: Yasushi Miyajima, Gifu (JP); Koji Hirosawa, Gifu (JP); Ryoichi Yokoyama, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 8 days.

(21) Appl. No.: 10/339,647

(22) Filed: Jan. 10, 2003

(65) Prior Publication Data

US 2003/0136962 A1     Jul. 24, 2003

(30) Foreign Application Priority Data

Jan. 11, 2002  (JP)  ............... 2002-004777

(51) Int. Cl.
  *G02F 1/1333*  (2006.01)
  *G02F 1/1343*  (2006.01)
(52) U.S. Cl. .................. 349/138; 349/38; 349/139
(58) Field of Classification Search ............... 349/54, 349/55, 138, 139, 38
  See application file for complete search history.

(56) References Cited

U.S. PATENT DOCUMENTS

| | | | |
|---|---|---|---|
| 4,617,563 A | 10/1986 | Fujiwara et al. | |
| 5,721,596 A * | 2/1998 | Kochi | 349/42 |
| 5,724,107 A * | 3/1998 | Nishikawa et al. | 349/38 |
| 5,982,460 A | 11/1999 | Zhang et al. | |
| 6,115,088 A | 9/2000 | Zhang et al. | |
| 6,133,976 A | 10/2000 | Kimura | |
| 6,259,493 B1 * | 7/2001 | Nakamura et al. | 349/38 |
| 6,271,543 B1 | 8/2001 | Ohtani et al. | |
| 6,330,047 B1 * | 12/2001 | Kubo et al. | 349/147 |
| 6,356,327 B1 * | 3/2002 | Moore | 349/139 |
| 6,525,788 B1 * | 2/2003 | Nakagawa et al. | 349/44 |
| 6,590,630 B2 * | 7/2003 | Kim | 349/192 |
| 6,610,997 B2 * | 8/2003 | Murade | 257/72 |

FOREIGN PATENT DOCUMENTS

| | | |
|---|---|---|
| EP | 1174757 A2 | 1/2002 |
| JP | 6-95144 | 9/1992 |
| JP | 10-39336 A | 2/1998 |

* cited by examiner

*Primary Examiner*—Andrew Schechter
(74) *Attorney, Agent, or Firm*—Morrison & Foerster LLP

(57) ABSTRACT

The active matrix display device has a thin film transistor and a pixel electrode, which is provided with a pixel voltage through the thin film transistor, for each of pixels. A supplemental pixel electrode, which is connected to the pixel electrode of one of the pixels adjacent to each other, and which extends to the region between the two pixels adjacent to each other, is also disposed. The supplemental pixel electrode enables the region between the pixels to be used as a part of the display region. The liquid crystal of this region is also driven by the voltage same as the pixel electrode. The configuration of the peripheral circuit of the pixel portion is simplified, reducing the framing area of the panel.

2 Claims, 9 Drawing Sheets

ACTIVE MATRIX DISPLAY DEVICE WITH ELECTRODE BETWEEN ADJACENT PIXELS

BACKGROUND OF INVENTION

1. Field of the Invention

This invention relates to an active matrix display device, specifically to an active matrix display device with an improved display quality.

2. Description of the Related Art

A flat panel display device including a reflection type active matrix liquid crystal display device (referred to as LCD hereinafter) can be thin, small and light, and it operates with low-power consumption. The LCD has been used as a display part in various devices such as mobile information device. The LCD, whose pixel has a switching element and a thin film transistor, is known as an active matrix type. The panel of the active matrix display device is highly reliable for maintaining displayed contents of the pixels, which provides the active matrix display device with high display quality.

FIG. 7 shows an equivalent circuit of a pixel in the active matrix LCD. Each pixel has a thin film transistor (TFT) 11 connected to a gate line and a data line. When the TFT is turned on by a selection signal outputted to the gate line, the data corresponding to the display content is supplied to a liquid crystal capacitance 12 (Clc) from the data line through the TFT. It is necessary to accurately keep the display data from the time when the TFT is first selected for writing to the time when the TFT is selected again in the next sequence. Therefore, a storage capacitance 13 (Csc) is connected to the TFT in series with the liquid crystal capacitance Clc.

FIG. 8 is a plan view showing the configuration of the pixel portion on a TFT forming substrate (a first substrate 100 in FIG. 9) of the conventional LCD. FIG. 9 is a cross-sectional view of the LCD configuration along with the X—X cross sectional line in FIG. 8. The LCD has a first substrate and a second substrate with the liquid crystal between them. In the active matrix LCD, the TFTs 11 and pixel electrodes 74 are arranged in a matrix configuration on the first substrate 100. A common electrode 56, to which a common voltage Vcom is supplied, and a color filter 54 are disposed on the second substrate 500, which is disposed facing to the first substrate 100. The voltage applied between the pixel electrode 74 and the common electrode 56, which are facing each other with the liquid crystal between them, drives the liquid crystal capacitance Clc.

The TFT disposed for each of the pixels on the first substrate 100 side is a top-gate type TFT, whose gate electrode is located above an active layer 64, as seen from FIG. 9. The active layer 64 of the TFT is patterned on the substrate 100 as shown in FIG. 8. A gate insulating layer 66 is disposed covering over the active layer 64, and the gate line, which also functions as a gate electrode, is disposed on the gate insulating layer 66. The part of the active layer 64 facing against the gate electrode is a channel region. A drain region 64d and a source region 64s with an impurity doped are formed at the corresponding sides of the channel region.

The drain region 64d of the active layer 64 is connected to the data line, which functions also as a drain electrode 70, through a contact hole formed in an interlayer insulating layer 68 covering the gate electrode.

Also, a flattening insulating layer 72 is disposed covering the data line and the drain line 70. The source region 64s of the active layer 64 is connected to pixel electrode 74 made of ITO (Indium Tin Oxide) on the flattening insulating layer 72 through a contact hole.

The source region 64s of the active layer 64 functions also as a first electrode 80 of the storage capacitance Csc disposed for each of the pixels and extends further, as shown in FIG. 8, from the contact region of the pixel electrode 74. A second electrode 84 of the storage capacitance element Csc is formed simultaneously with and in the same layer as the gate electrode as seen from FIG. 9, but it is formed in a region away from the gate electrode, keeping a certain distance between them. The gate insulating layer 66 also works as a dielectric between the first electrode 80 and the second electrode 84. The second electrode 84 of the storage capacitance element Csc, are not independently disposed for each of the pixel as seen from FIG. 8. But it is disposed in the pixel region along the row direction of the matrix in the same manner as the gate line 60. A predetermined storage capacitance voltage Vsc is applied to the second electrode 84.

The storage capacitance element Csc disposed for each of the pixels maintains the electric charge corresponding to the display contents, which should be applied to the liquid crystal Clc, when the TFT is not selected. Therefore, the voltage change of the pixel electrode 74 can be maintained, enabling the display contents to be kept unchanged during one sequence.

The gate line 60 and the second electrode 84 (a storage capacitance line) for forming the storage capacitance element Csc are disposed in parallel. The location of these two lines with respect to the location of the pixel electrode 74 is shown in FIG. 10. The gate line 60 and the second electrode 84 (a storage capacitance line) are disposed in the layer under the pixel electrodes 74, adjacent to each other. The portions of the lines between the pixels shown as shaded areas in the figure are not covered by either of the pixel electrodes 74.

The liquid crystal corresponding to the portions of the lines shown as shaded areas occasionally shows white light. This is often observed when the adjacent pixels appear as black elements. When white light is observed, the display quality is deteriorated.

The gate line 60 and the second-electrode 84 (the storage capacitance line) are usually made of reflecting material such as aluminum, molybdenum and chrome, which reflect light. Therefore, because the pixel electrodes 74, which control the reflection of the light, do not exist at the upper layer of the lines (shaded in the figure) in the conventional device, the alignment of the liquid crystal corresponding to this portion can not be controlled. This leads to a frequent white light observation. Although this problem can be solved by disposing a black matrix (BM), the aperture ratio would be reduced.

Therefore, this invention is directed to prevent the above-mentioned problem and to offer the active matrix display device of high quality display.

SUMMARY OF THE INVENTION

The active matrix display device of this invention has a thin film transistor and a pixel electrode, which is provided with a pixel voltage through the thin film transistor, for each of pixels. A supplemental pixel electrode, which is connected to one of two pixel electrodes adjacent to each other, and which extends to the region between the two pixels adjacent to each other, is also disposed.

With the supplemental pixel electrode of above configuration, the region between the pixels can be utilized as a part of display region. In this configuration, the same voltage as that of the pixel electrode can drive the liquid crystal in this region. Therefore, even when a black matrix is not used to provider a larger aperture ratio, this region will not show white light when the pixel displays black, leading to high display quality.

It is also possible to place a floating electrode, which configures a capacity coupling at the both pixel electrodes of the pixels adjacent to each other through an insulating layer. In this configuration, the voltage of the floating electrode changes in accordance with the voltage change of the pixel electrode. Since the liquid crystal in the adjacent region in the liquid crystal display device can be driven by the similar voltage to the voltage of the pixel region, this region will not show white light when the pixel displays black, solving the abovementioned problem.

DETAILED DESCRIPTION OF THE INVENTION

The embodiment of this invention will be explained in detail by referring to FIGS. 1–6. A LCD is used as an example to describe the invention.

Figure 1:
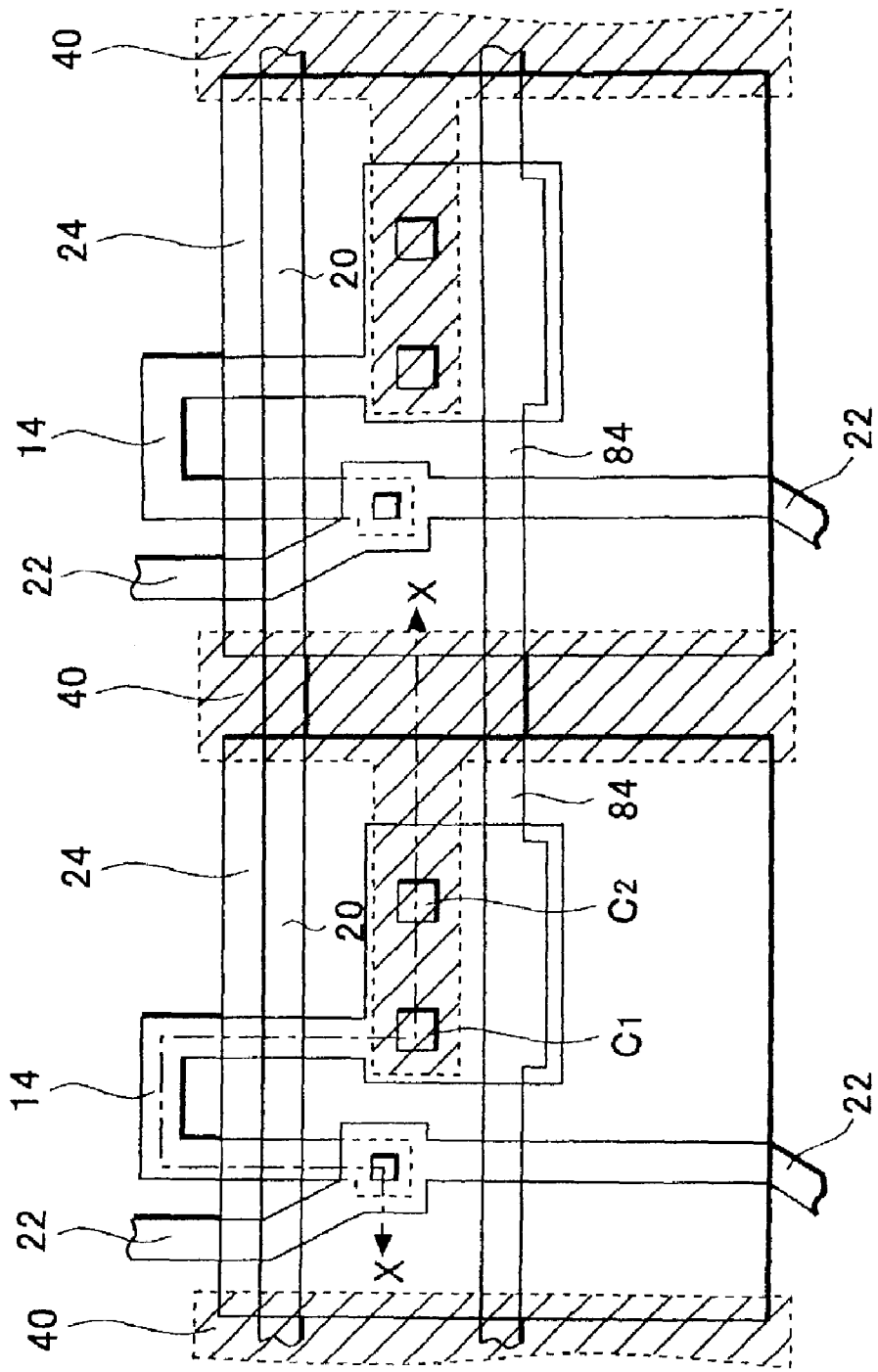
FIG. 1 is a plan view of a display pixel in an active matrix LCD of a first embodiment of this invention.
Figure 2:
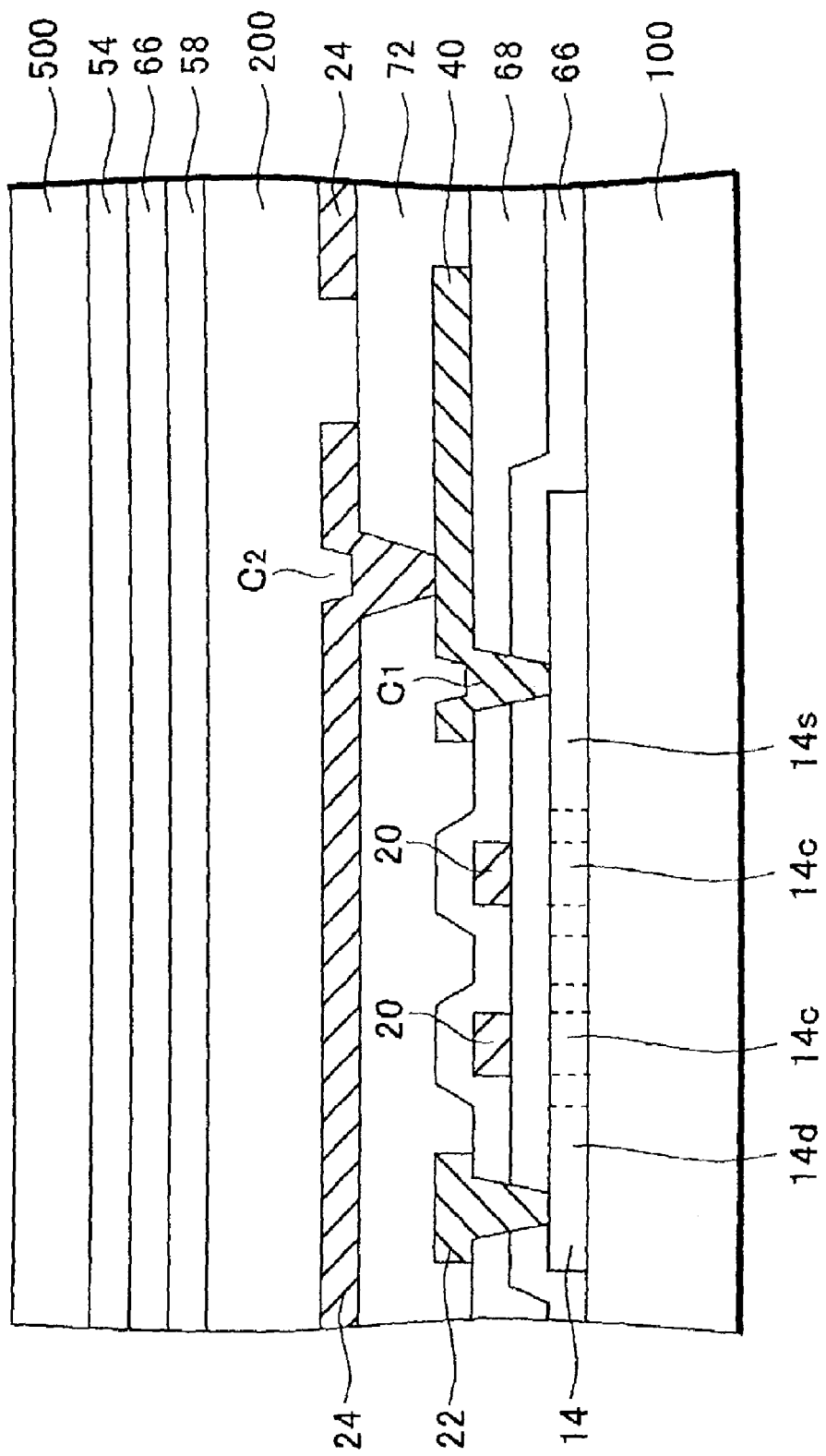
FIG. 2 is a cross-sectional view of the LCD of FIG. 1 cut along the X—X cross-sectional line shown in FIG. 1.
Figure 9:
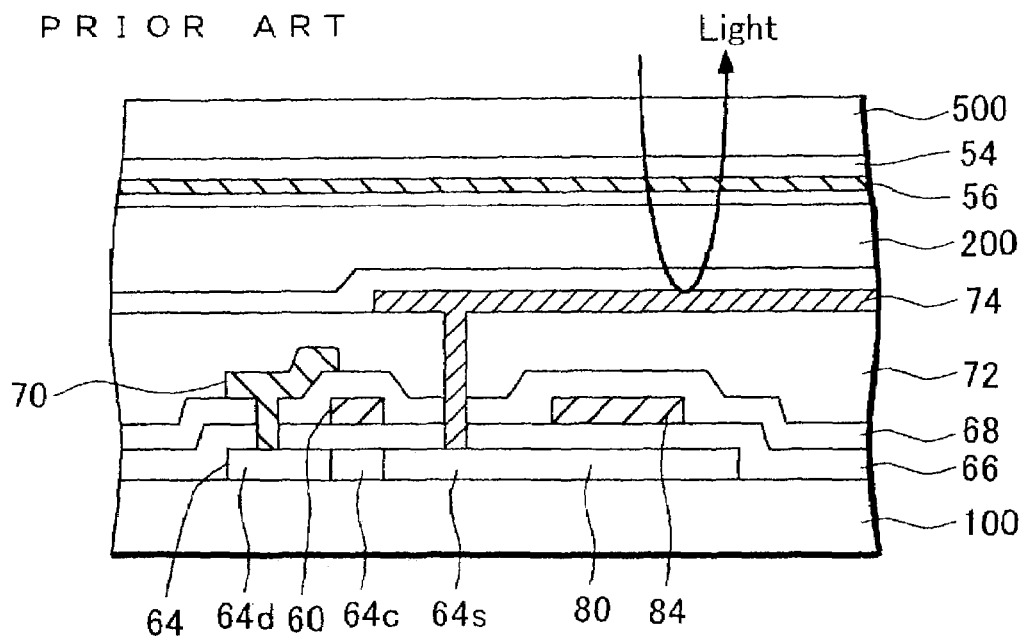
FIG. 9 is a cross-sectional view of the LCD of FIG. 8 cut along the X—X cross-sectional line shown in FIG. 8.
Figure 10:
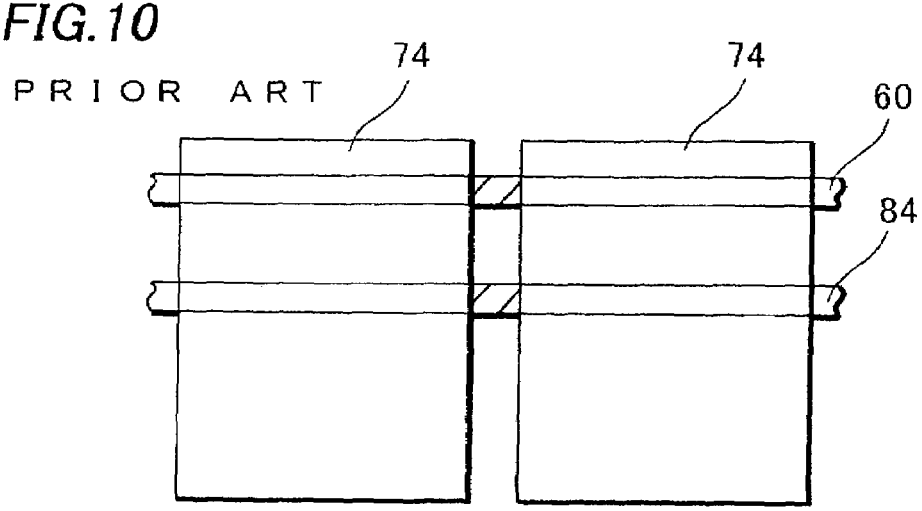
FIG. 10 schematically shows the location of the pixel electrode 74 with respect to the location of the second electrode 84 of the LCD device of FIG. 8.

FIG. 1 is a plan view of a display pixel in an active matrix LCD of a first embodiment of this invention. FIG. 2 is a cross-sectional view of the LCD cut along the X—X cross-sectional line shown in FIG. 1. The same reference numerals will be given to the same components as in FIGS. 9 and 10, and the explanation on those components will be omitted.

The LCD has a first substrate 100 and a second substrate 500 made of transparent insulating material such as glass, and a liquid crystal 200 placed between the two substrates.

Figure 7:
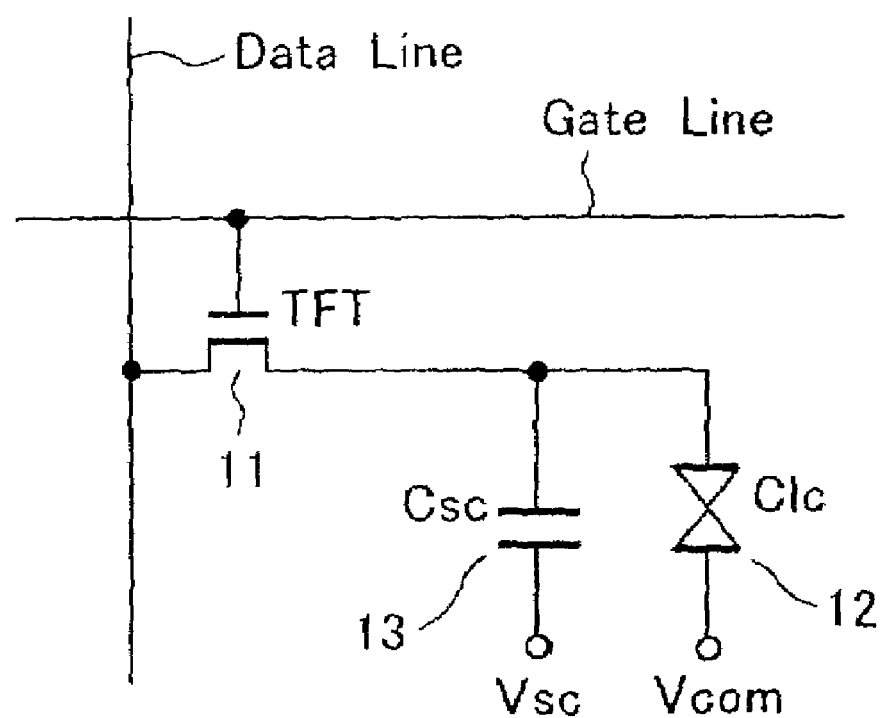
FIG. 7 shows an equivalent circuit of a pixel of a conventional active matrix LCD.
Figure 8:
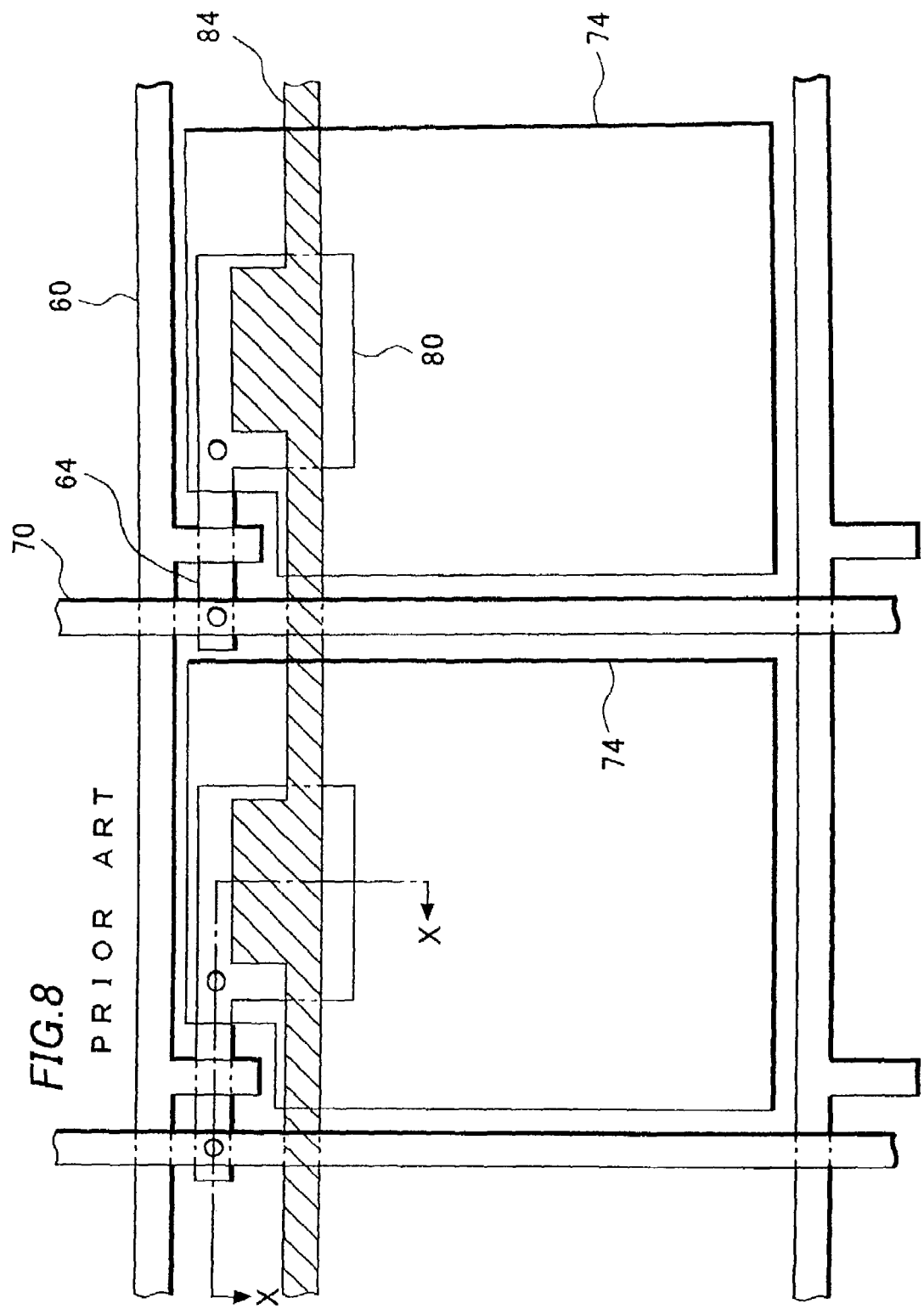
FIG. 8 is a plan view of the pixel portion on a TFT forming substrate of the conventional LCD.

An equivalent circuit of each of pixels is shown in FIG. 7. Pixel electrodes 24 are disposed in a matrix configuration on the first substrate 100 as seen from FIG. 1. A top gate type TFT 1 is placed for each of the pixel electrodes.

An active layer 14 of the TFT 1 in each of the pixel is in a U-shape and intersects, at two points, a gate line 20, which extends straight in a row direction. At the portion where the active layer and the gate line intersect each other, the active layer 14 makes a channel region 14c, and the gate line 20 becomes the gate. A gate insulating layer 66 is formed between the gate and the channel region 14c. A drain 14d of the active layer 14 is connected to a data line 22 extending in a column direction through a contact hole made in an interlayer insulating layer 68 and the gate insulating layer 66.

And a source 14s of the active layer 14 is connected to a supplemental pixel electrode 40 through a contact hole C1 made in the interlayer insulating layer 68 and the gate insulating layer 66. The supplemental pixel electrode 40 is disposed in the same layer (for example, an aluminum layer) as the data line 22 on the interlayer insulating layer 68 and extends over the region between the pixels adjacent to each other in the row direction. That is, the supplemental pixel electrode 40 extends to cover the area between the pixel electrodes 24, of the pixel adjacent to each other. Additionally, the supplemental pixel electrode 40 is connected to the pixel electrode 24 (a reflecting electrode) on the upper layer through a contact hole C2 made in a flattening insulating layer 72.

Also, a storage capacitance line 84 is configured in the same layer (for example, molybdenum film, chrome film) as the gate line 20, and extends in a row direction. The storage capacitance line 84 is overlapped with a part of the active layer 14 through the gate insulating layer 66. This overlapped part forms a storage capacitance element.

According to this embodiment, the supplemental pixel electrode 40 enables the area between the pixels to be utilized as a part of the display region. Since the same voltage applied to the pixel electrode 24 through the top gate type TFT 1 also drives the liquid crystal in the area between the pixels, this area will not show white light, thus improving the display quality.

Figure 3:
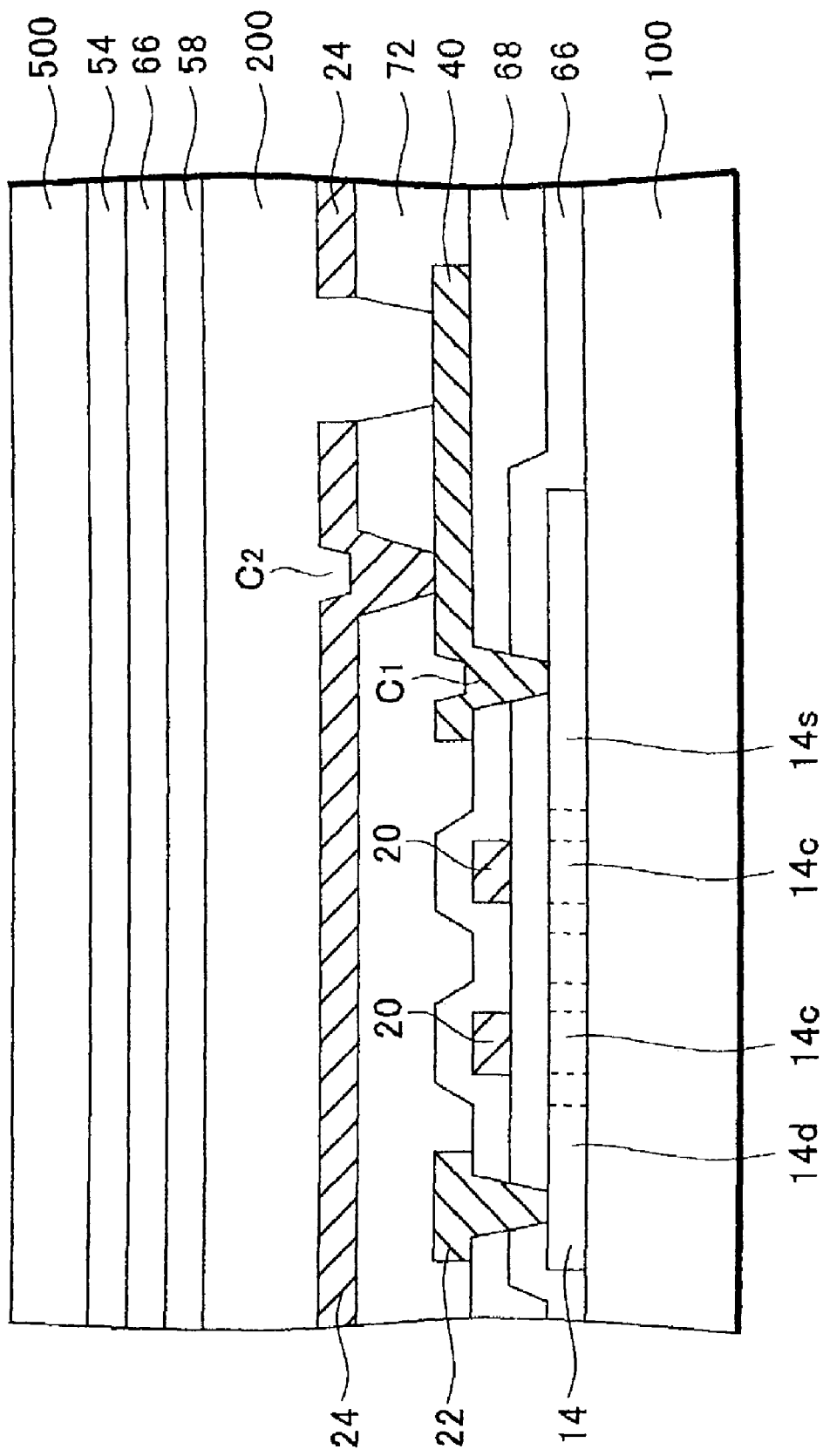
FIG. 3 is a cross-sectional view of a display pixel in an active matrix LCD of a second embodiment of this invention.

FIG. 3 is a cross-sectional view of a display pixel in an active matrix LCD of a second embodiment of this invention. This figure shows a cross section of the device corresponding to the cross section of FIG. 2. The planar configuration of the device of this embodiment is substantially the same as that of FIG. 2 except the cut in the insulating layer 72 as described below.

In the first embodiment mentioned above, there is the thick flattening insulating layer 72 on the supplemental pixel electrode 40 extending over the area between the pixel electrodes 24, adjacent to each other. And the liquid crystal 200 is placed on the flattening insulating layer 72. However, when the insulating layer is placed between the electrode and the liquid crystal, an electric charge is accumulated in this part, resulting in burning of the liquid crystal.

Therefore, the thick flattening insulating layer 72 on the supplemental pixel electrode 40 is removed, as seen from FIG. 3, in this embodiment. For example, etching can be performed to expose the supplemental pixel electrode 40 by using the pixel electrodes 24, as masks. This prevents the burning of the liquid crystal and improves the display quality.

Figure 4:
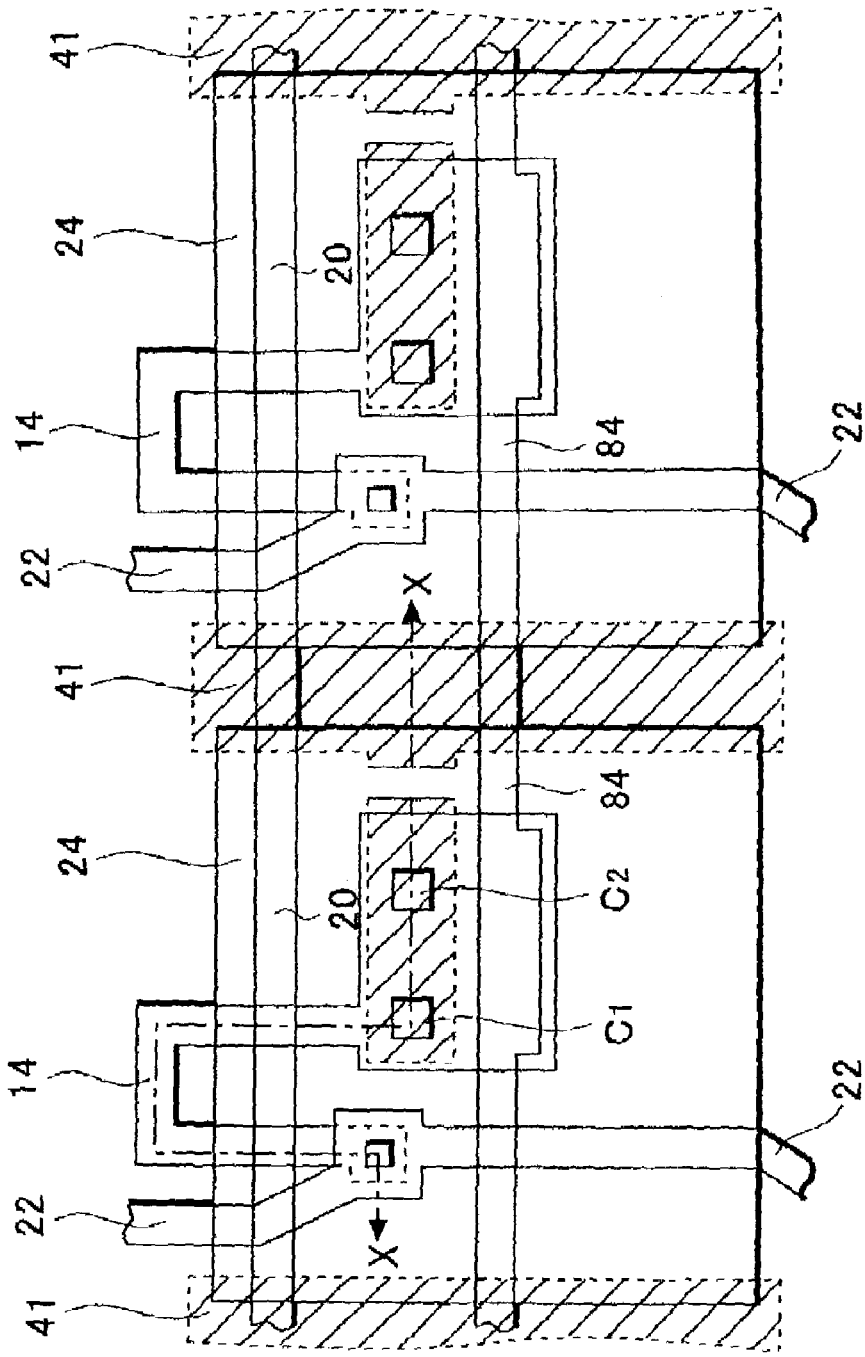
FIG. 4 is a plan view of a display pixel in an active matrix LCD of a third embodiment of this invention.
Figure 5:
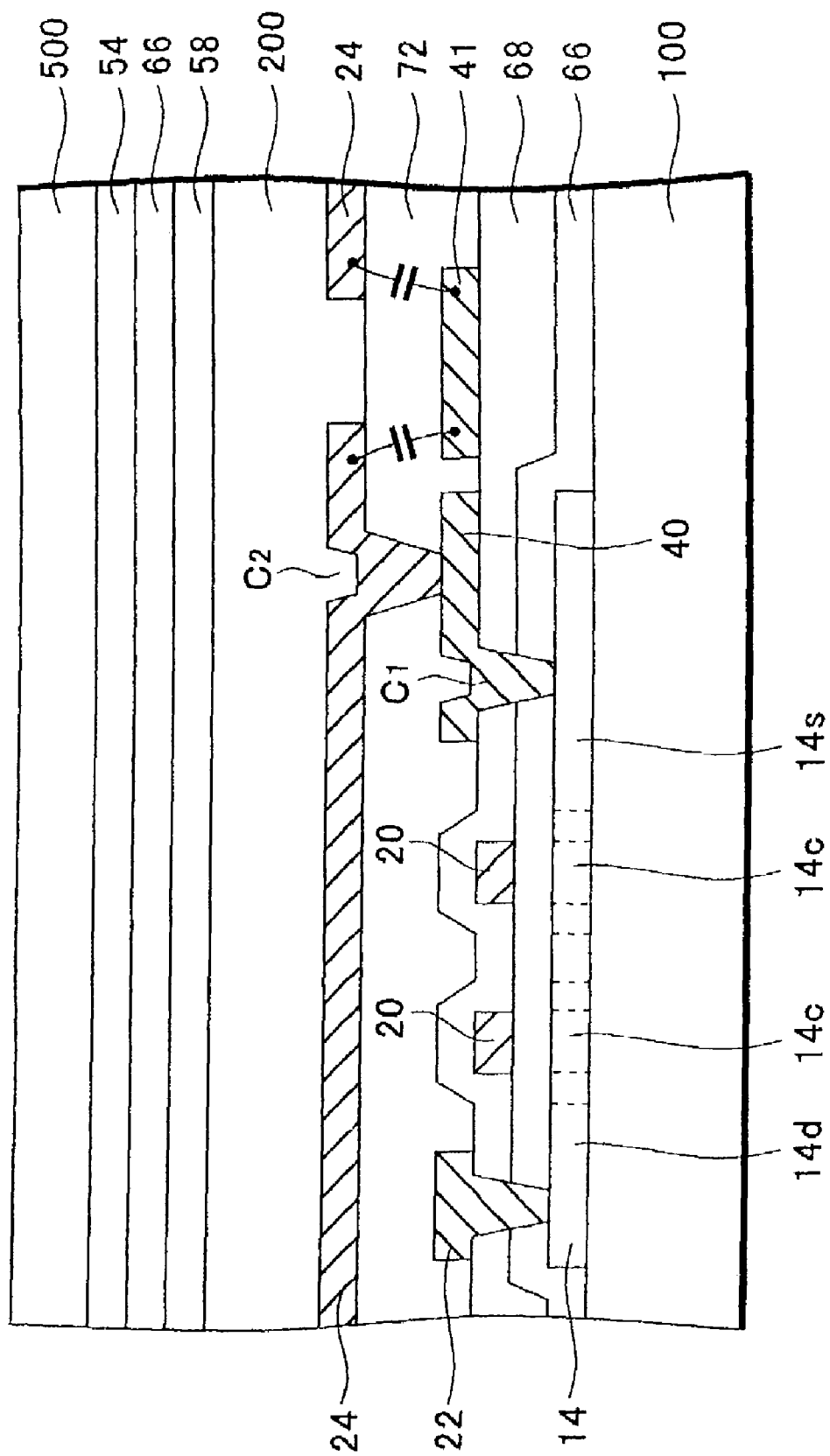
FIG. 5 is a cross-sectional view of the LCD of FIG. 4 cut along the X—X cross-sectional line shown in FIG. 4.

FIG. 4 is a plan view of a display pixel in an active matrix LCD of a third embodiment of this invention. FIG. 5 is a cross-sectional view of the LCD cut along the X—X cross-sectional line shown in FIG. 4. Again, the same reference numerals are used to indicate the same components. The explanation on these components will be omitted.

In this embodiment, the portion of the supplemental pixel electrode 40 extending over the area between the adjacent pixels of FIG. 1 is cut off from the remaining portion of the supplemental electrode 40. Thus, the cut-off portion becomes a floating electrode 41 of this embodiment and forms a capacity coupling with each of the pixel electrodes 24, 24 of the adjacent pixels through the flattening insulating layer 72.

The voltage of the supplemental pixel electrode 40 is the same voltage as the pixel electrode 24 in the first embodiment, as the supplemental pixel electrode 40 is connected to the pixel electrode 24 of one of the pixels. However, since the floating electrode 41 is electrically floating, the voltage is determined by the voltage of the pixel electrode 24, with which the floating electrode 40 forms the capacity coupling. That is, the voltage is determined based on the capacitance of the pixel electrode 24 and the floating electrode 41, and the capacity coupling of these two electrodes.

Therefore, when both of the adjacent pixels appear black, the voltage corresponding to that of these two pixel electrodes 24, (the voltage corresponding to black display) is applied to the floating electrode 41, resulting in substantially similar black representation at the area between the adjacent pixels. On the other hand, when one of the adjacent pixels appears black and the other pixel appears white, a voltage between the black display and the white display is applied to the floating electrode 41, resulting in a gray representation. In this manner, the voltage of the floating electrodes 41 changes along with the voltage change of the pixel electrodes 24. The alignment of the liquid crystal 200 on the floating electrode 41 is also determined by the voltage change of the pixel electrodes 24, eliminating the conventional problems of the conventional device.

The floating electrode 41 of this embodiment is configured by cutting off a portion of the supplemental pixel electrode 40 of the first embodiment. The floating electrode 41 can also be configured by using a different layer.

In FIG. 5, the floating electrode 41 equally overlaps the pixel electrodes 24, located at the both sides. However, it is possible to make the induced voltage of the floating electrode 41 be controlled substantially by the voltage of one of the pixel electrodes by disposing the floating electrode 41 substantially toward that pixel electrode to overlap more with that pixel electrode than the other electrode. This configuration is suitable for displaying letters and drawing, which requires clear-cut boundary.

Figure 6:
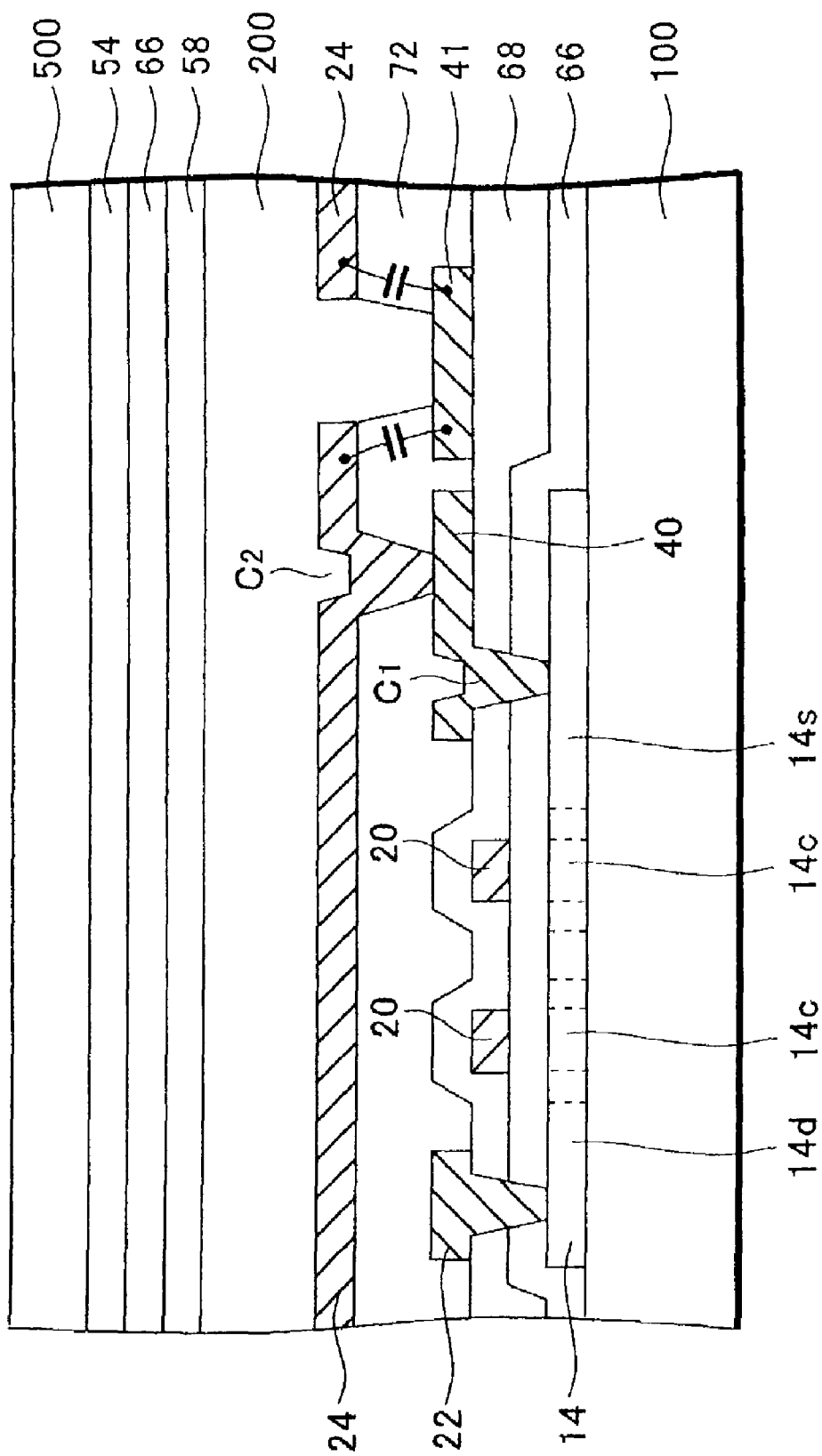
FIG. 6 is a cross-sectional view of a display pixel in an active matrix LCD of a forth embodiment of this invention.

FIG. 6 is a cross-sectional view of a display pixel in an active matrix LCD of a forth embodiment of this invention. This figure shows a cross section of the device corresponding to the cross section of FIG. 4. The planar configuration of the device of this embodiment is substantially the same as that of FIG. 4 except the cut in the insulating layer 72 as described below.

The thick flattening insulating layer 72 on the floating electrode 41 of the third embodiment is removed in this embodiment. The etching is performed to expose the floating electrode 41 by using, for example, the pixel electrodes 24, as masks. This prevents the burning of the liquid crystal 200 and improves the display quality, for the same reason as the second embodiment.

The supplemental pixel electrode, which is connected to the pixel electrode of one of the adjacent pixels and which extends to the area between the adjacent pixels, is disposed in the active matrix LCD of this invention, enabling the area between the pixels to be used as a part of the display area. In this configuration, since the voltage same as the pixels electrode also drives the area between the pixels, this area does not show white light when the pixel displays black, leading to the improved display quality.

Also, the floating electrode, which forms a capacity coupling at the both pixel electrodes of the pixels adjacent to each other through the insulating layer, is disposed. The voltage of the floating electrode changes in accordance with the voltage change of the pixel electrode. Since the voltage similar to that of the pixel region also drives the liquid crystal in the area between the pixels of the LCD, the region will not show white light when the pixel displays black.

What is claimed is:

1. An active matrix display device comprising:
   a plurality of pixels;
   a thin film transistor provided for each of the pixels;
   a pixel electrode provided for each of the pixels; and
   a supplemental pixel electrode provided for each of the pixels and connected to a corresponding pixel electrode,
   wherein the supplemental pixel electrode extends to and covers a region between the corresponding pixel and a pixel that is next to said corresponding pixel, a part of the supplemental pixel electrode is disposed under the corresponding pixel electrode with an insulating layer disposed between the supplemental pixel electrode and the corresponding pixel electrode, and a portion of the insulating layer disposed on the supplemental pixel electrode is removed to create an opening that is disposed between the corresponding pixel and the pixel that is next to the corresponding pixel.

2. An active matrix display device comprising:
   a plurality of pixels;
   a thin film transistor provided for each of the pixels;
   a pixel electrode provided for each of the pixels;
   a floating electrode disposed to cover a region between two adjacent pixels and forming a capacitive coupling with each of the pixel electrodes of the two adjacent pixels; and
   an insulating layer disposed between the floating electrode and the two corresponding pixel electrodes,
   wherein the floating electrode is disposed partially under the corresponding pixel electrodes and a portion of the insulating layer disposed on the floating electrode is removed.

* * * * *